United States Patent Office 3,338,951
Patented Aug. 29, 1967

3,338,951
CYCLIC SILALKYLENESILOXANE COMPOSITION
Edgar W. Knaub, Schenectady, N.Y., assignor to General Electric Company, a corporation of New York
No Drawing. Filed July 28, 1965, Ser. No. 475,557
4 Claims. (Cl. 260—46.5)

This invention relates to a new series of cyclic silalkylenesiloxanes and to their use. More particularly, this invention relates to organosilicon materials having the formula:

(1)
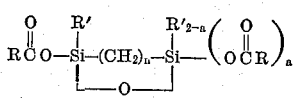

where R is selected from the class consisting of methyl and ethyl, R' is selected from the class consisting of monovalent hydrocarbon radicals, monovalent halogenated hydrocarbon radicals, and cyanoalkyl radicals, $n$ is an integral number of from 2 to 4, inclusive, and $a$ is an integral number of from 1 to 2, inclusive. Additionally, this invention relates to the use of the materials of Formula (1) as curing agents for room temperature vulcanizing silicone compositions in conjunction with a fluid silanol-terminated organopolysiloxane.

A wide variety of materials are known as curing agents for room temperature vulcanizing silicone materials. Included among these curing agents are linear silalkylene compounds having acyloxy substituents as, for example:

(2)   $R_p''(AcO)_{3-p}SiR'''SiR_q(OAc)_{3-q}$ where R'' is a monovalent organic radical, R''' is a divalent alkylene or arylene radical, $p$ is 0 or 1, and $q$ is 0 or 1, as shown in French Patent 1,137,495. While such materials are effective in curing room temperature vulcanizing silicone materials, a problem is presented in that the curing agents are solid at room temperature. Thus, blending of these curing agents with the silanol-terminated organopolysiloxanes is difficult. On the other hand, it has unexpectedly been discovered that the cyclic compounds described by Formula (1) are liquid at room temperature and can, therefore, be easily blended into a silanol-terminated organopolysiloxane, stored, and later, when exposed to atmospheric moisture, activate to cure the silicone material without being separated from the silanol-terminated material during storage.

The materials of the present invention are prepared by heating, at elevated temperatures, an acyloxy-substituted silalkylene compound of the formula:

(3)

where R, R', $n$, and $q$ are as previously defined. The heating causes a condensation, resulting in a product of Formula (1) and, as a by-product, an acid anhydride. This heating can be accomplished either by distillation at reduced pressure or by a hot tube reaction, each in the absence of a catalyst.

In using the materials of Formula (1) to cure silanol-terminated organopolysiloxanes for room temperature vulcanizing compositions it has unexpectedly been found that not only do the acyloxy groups react with the silanol chain terminals of the organopolysiloxane to increase chain length, but, additionally, the cyclic ring is split, apparently through the action of the acid which is generated, to provide cross-linking. As a result of the combination of the acyloxy-silanol reaction and the opening of the silalkylenesiloxane ring, a properly cured room temperature vulcanized silicon rubber results.

The most suitable starting materials for producing the fluid silanol-terminated organopolysiloxanes have been found to be those cyclic organopolysiloxanes of the general formula:

(4)   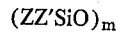$(ZZ'SiO)_m$ where Z and Z' are organic radicals selected from the class consisting of alkyl radicals, e.g., methyl, ethyl, propyl, butyl, hexyl, etc.; aryl radicals, e.g., phenyl, diphenyl, naphthyl, etc.; alkaryl radicals, e.g., tolyl, xylyl, ethylphenyl, etc.; aralkyl radicals, e.g., benzyl, phenethyl, etc.; haloaryl radicals, e.g., chlorophenyl, tetrachlorophenyl, dichlorophenyl, etc.; and alkenyl radicals, e.g., vinyl, allyl, etc., which are advantageously present in amounts less than 5 to 10% of the total number of silicon-bonded organic radicals in the starting material; and $m$ is an integer equal to at least 3, e.g. from about 3 to 10, or more, depending upon the organic group in the starting organopolysiloxane.

The silanol-terminated organopolysiloxanes are generally linear fluid methyl polysiloxanes containing terminal silicon-bonded hydroxy groups and having an average of about 2 methyl groups per silicon atom. These materials are well known in the art and can be prepared, for example, by starting with cyclic dimethylpolysiloxanes having the formula:

(5)   $[(CH_3)_2SiO]_m$ where $m$ is as previously defined. Among the preferred cyclic dimethylpolysiloxanes employed as starting materials can be mentioned, for example, hexamethylcyclotrisiloxane, octamethylcyclotetrasiloxane, and decamethylcyclopentasiloxane, as well as mixtures of these three cyclic dimethylpolysiloxanes, alone, or with higher cyclopolysiloxanes.

In preparing the linear, fluid dimethylpolysiloxane containing terminal silicon-bonded hydroxy groups, the starting cyclic dimethylpolysiloxanes are advantageously heated at temperatures of from about 125° to 150° C. with small amounts of a siloxane rearrangement and condensation catalyst (about 0.001 to 0.01%, by weight, based on the weight of the cyclic organopolysiloxane), such as potassium hydroxide, tetrabutylphosphonium hydroxide, etc. The temperature and time at which this heating takes place will vary depending upon such factors as the particular cyclic dimethylpolysiloxane employed, the siloxane rearrangement and condensation catalyst employed, the concentration of catalyst, the desired viscosity, etc. In general, the polymerization is carried out for a time sufficient to obtain a high molecular weight product of about 150,000 to 2,000,000 centipoises viscosity, when measured at 25° C. Generally, this product is obtained in a time which varies from a few minutes to 4 to 6 or more hours, depending upon the reactants and the reaction conditions.

The high molecular weight product thus obtained is then treated with water to reduce its viscosity to about 100 to 100,000 centipoises at 25° C. This can be accomplished by blowing steam across the surface of the high molecular weight product for a time sufficient to give the lower viscosity material having terminal silicon-bonded hydroxy groups. Instead of blowing steam across the surface of the high molecular weight product, the steam may also be forced through the product. The resulting linear fluid organopolysiloxane containing terminal silicon-bonded hydroxy groups will have the general formula:

(6)
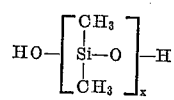

where $x$ is a whole number greater than 1, e.g., from about 50 to 5,000 or more. Such compositions and methods for preparing the same are more particularly described in U.S. Patent 2,607,792—Warrick. The use of steam in this fashion causes a decrease in the viscosity of the high molecular weight product, at the same time forming linear polysiloxanes having the terminal silicon-bonded hydroxy groups.

An alternative method for making the linear fluid dimethylpolysiloxanes containing terminal silicon-bonded hydroxy groups comprises adding water to the high molecular weight polymers described above in such amounts that when heated at elevated temperatures, for instance from about 150° to 170° C., the viscosity is reduced to the desired level of 100 to 100,000 centipoises. The amount of water used will vary depending upon such factors as the molecular weight of the polymer being treated, the time and temperature at which the polymer being treated will be heated, the ultimate viscosity desired, etc. The amount of water used to reduce the molecular weight can be readily determined. For example, a linear fluid dimethylpolysiloxane containing terminal silicon-bonded hydroxyl groups and having a viscosity of from 1,000 to 2,000 centipoises can be obtained by heating a high molecular weight dimethylpolysiloxane prepared in accordance with the directions above, of about 2,000,000 centipoises viscosity, with 0.5%, by weight, of water for about 2 hrs. at 150° to 170° C.

While the polydimethylsiloxane having silanol chain terminals is generally preferred, up to about 50% of the polysiloxane can be formed with siloxy units containing the other organic radicals mentioned above. For example, a mixture of octamethylcyclotetrasiloxane and a cyclic polymer of ethylmethylsiloxane having the formula:

(7) $[(CH_3)(C_2H_5)SiO]_m$ where $m$ is as previously defined, can be employed. Additionally, mixtures of cyclic polymers of polydimethylsiloxane with cyclic polymers of polydiphenylsiloxane, polymethylphenylsiloxanes, etc., are useful as starting materials for the preparation of silanol-terminated organopolysiloxane for use in accordance with this invention.

When the compounds of Formula (1) are used as curing agents for room temperature vulcanized silicone rubbers, in addition to the silanol-terminated materials of Formula (6), the composition may also contain a metallic salt of an organic carboxylic acid. Only particular metallic salts provide room temperature curing characteristics and the metals from which these salts are derived are selected from the class consisting of lead, tin, zirconium, antimony, iron, cadmium, barium, calcium, titanium, bismuth, and manganese. Suitable acid radicals in these metallic salts are those yielding the resinate, linoleate, stearate, oleate, or lower acid radicals such as those yielding the acetate, the butyrate, the octoate, etc., radicals. Examples of operable metallic salts of carboxylic acids include, for example, dibutyl tin diacetate, tin naphthenate, lead octoate, tin octoate, iron stearate, tin oleate, antimony octoate, tin butyrate, dibutyl tin dilaurate, etc.

In general, the room temperature vulcanizing silicone rubber composition contain on the basis of 100 parts of the silanol-terminated organopolysiloxane, from 2 to 10 parts, preferably from 4 to 8 parts of the material of Formula (1), and from 0.05 to 10 parts, and preferably from 0.1 to 5 parts, by weight, of the metallic salt of the carboxylic acid.

In addition to the compound of Formula (1), the silanol-terminated organopolysiloxane, and the metallic carboxylic acid salt, the room temperature vulcanizing compositions can contain a filler. Various fillers can be employed including, for example, titanium dioxide, lithopone, zinc oxide, zirconium silicate, silica aerogel, iron oxide, diatomaceous earth, calcium carbonate, fumed silica, precipitated silica, finely divided glass fibers, etc. When these fillers are used, they should be used in an amount of from 10 to 300 parts, and preferably from 20 to 100 parts, by weight, per 100 parts of the silanol-terminated organopolysiloxane. In addition, other materials, may be included in the formulation to provide various properties, as for example the inclusion of a cupreous material, such as copper, copper oxides, and copper halides, to provide such properties as flame resistance.

The following examples are given for purposes of illustration and should not be considered as limiting in any way the full scope of the invention as covered in the appended claims. All parts in these examples are by weight.

*Example 1*

A material of Formula (3), 1,2-bis(diacetoxymethylsilyl)ethane, was prepared by the reaction of 1,2-bis(dichloromethylsilyl)ethane and acetic anhydride according to the equation:

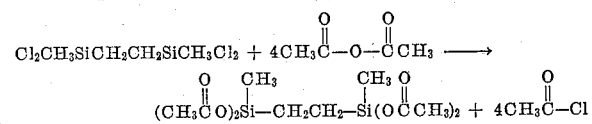

A quantity of 255 parts af acetic anhydride, a 25% excess, was added to 128 parts of the chlorine-substituted disilethylene compound in a reaction vessel, while simultaneously distilling the acetyl chloride formed in the reaction from the vessel. When a quantity of 160 parts of acetyl chloride had been removed, compared to a theoretical amount of 157 parts, the reaction mixture was flash distilled at a temperature of 160° C. and a pressure of 4 mm. to give 136 parts of product, the acetoxy-substituted disilethylene.

*Example 2*

A quantity of 40 parts of the product of Example 1 was fractionally distilled, at a reflux ratio of 20:1, to yield 22 parts of a product having an acetoxy content of 48.69%. The theoretical acetoxy content for the compound:

(9) 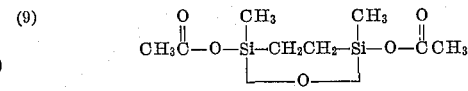

is 47.54%. This material was further purified by fractionally distilling at a reflux ratio of 90:1 and a pressure of 15 mm., collecting the fraction boiling at 110.3° C. A quantity of 5 parts was obtained and showed an elemental analysis of 38.57% carbon, 6.45% hydrogen, and 22.75% silicon, compared with the theoretical for the product of Formula (9) of 38.68% carbon, 6.49% hydrogen, and 22.62% silicon. This, in conjunction with an infra-red analysis of the product showing a band at 10.80 microns, characteristic of a siloxane bond in a five membered ring, confirmed the structure of the product as that of Formula (9).

*Example 3*

The material of Formula (9) was again prepared, this time utilizing a hot tube reaction. The apparatus for the reaction was an electrically heated hot tube with dimensions of 62 cm. length and 2.5 cm. diameter. A solution was prepared containing 75 parts of benzene and 75 parts of the product of equation (8). This material was passed through the hot tube at a rate of 0.38 g./min. in conjunction with nitrogen at a rate of 100 cc./min. The temperature in the hot tube was maintained at 470° C. A yellowish liquid was obtained at the effluent end of the hot tube which, according to vapor phase chromatography analysis, contained both linear starting material and cyclic siloxane in a ratio of 0.61:1. This yellowish liquid was flash evaporated to remove the benzene solvent and was then fractionally distilled resulting in the recovery of 19.5 parts of the material of Formula (9) and 24.5 parts of unreacted material having the formula of the product of equation (8), a yield of 56% based on the theoretical. The product of Formula (9) showed an acetoxy content of 48.0%, comparing well with the theoretical amount of 47.6%.

Example 4

The material produced in Example 2 was used as a curing agent for a silanol-terminated organopolysiloxane, equivalent to Formula (6) and having a viscosity at 25° C. of approximately 3,000 centipoises. A composition was prepared containing 100 parts of the organopolysiloxane, 5 parts of the product of Example 2, and 0.1 part of dibutyl tin diacetate as an accelerator. With atmospheric moisture excluded, this composition remained homogeneous and workable on storage. On exposure to atmospheric moisture, a tack-free surface resulted in about 5 minutes, and after 24 hours a 0.25″ thick section of cured rubber resulted.

Example 5

A composition similar to that in Example 4 was prepared using 85 parts of the same silanol-terminated organopolysiloxane as in Example 4, 15 parts of fumed silica, 5 parts of the material produced in Example 3, and 0.1 part of dibutyl tin diacetate. Again, a tack-free time of about 5 minutes was the result when the composition was exposed to atmospheric moisture. A rubber sheet having dimensions of 6″ x 6″ x 0.075″ was prepared with this composition and it was cured for 48 hours at 25° C. and 50% relative humidity. On testing, this rubber sheet showed an elongation of 180%, a tensile strength of 277 p.s.i., and a Shore A hardness of 43.

Thus, a new composition of matter, useful in the room temperature vulcanization of silanol-terminated organopolysiloxane fluids has been shown. The room temperature vulcanizing composition containing the material of the present invention as a curing agent can be utilized in any of the applications, well known in the art, for room temperature vulcanizing compositions.

What I claim as new and desire to secure by Letters Patent of the United States is:

1. A room temperature vulcanizing organopolysiloxane composition, protected from moisture and curable to the solid, elastic state upon exposure to moisture, consisting essentially of, by weight:
    (1) 100 parts of a silanol-terminated polydiorganosiloxane having a viscosity of from about 100 to 100,000 centipoises at 25° C., the organo groups of said polydiorganosiloxane being selected from the class consisting of alkyl, aryl, aralkyl, alkaryl, haloaryl, and alkenyl radicals,
    (2) from 2 to 10 parts of a cyclic silalkylenesiloxane having the formula:

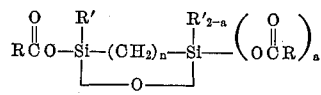

where R is selected from the class consisting of methyl and ethyl, R′ is selected from the class consisting of monovalent hydrocarbon radicals, monovalent halogenated hydrocarbon radicals, and cyanoalkyl radicals, $n$ is an integral number of from 2 to 4, inclusive, and $a$ is an integral number of from 1 to 2, inclusive, and
    (3) from 0.05 to 10 parts of a metallic salt of an organic carboxylic acid in which the metal ion is selected from the class consisting of lead, tin, zirconium, antimony, iron, cadmium, titanium, bismuth, and manganese.

2. The composition of claim 1 wherein the cyclic silalkylenesiloxane is:

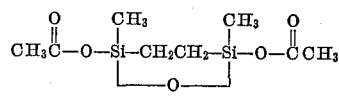

3. The composition of claim 1 in which said metal ion is tin.

4. The composition of claim 1 in which said metallic salt of an organic carboxylic acid is dibutyl tin diacetate.

References Cited

UNITED STATES PATENTS

| | | | |
|---|---|---|---|
| 3,035,016 | 5/1962 | Bruner | 260—46.5 |
| 3,041,362 | 6/1962 | Merker | 260—448.20 |

FOREIGN PATENTS

| | | |
|---|---|---|
| 1,137,497 | 1/1957 | France. |
| 1,025,917 | 4/1966 | Great Britain. |

DONALD E. CZAJA, *Primary Examiner.*

LEON J. BERCOVITZ, *Examiner.*

M. I. MARQUIS, *Assistant Examiner.*